United States Patent [19]

Shibuta et al.

[11] Patent Number: 4,668,501
[45] Date of Patent: May 26, 1987

[54] PROCESS FOR PREPARING A TITANIUM OXIDE POWDER

[75] Inventors: Daisuke Shibuta, Saitama; Shinichiro Kobayashi, Tokyo; Motohiko Yoshizumi, Saitama; Hideo Arai, Itakura, all of Japan

[73] Assignee: Mitsubishi Kinzoku Kabushiki Kaisha, Tokyo, Japan

[21] Appl. No.: 618,303

[22] Filed: Jun. 6, 1984

Related U.S. Application Data

[63] Continuation of Ser. No. 445,266, Nov. 29, 1982, abandoned.

[30] Foreign Application Priority Data

Nov. 27, 1981 [JP] Japan ................................. 56-189103

[51] Int. Cl.$^4$ .............................................. C01G 23/04
[52] U.S. Cl. ..................................... 423/608; 423/609
[58] Field of Search ................................. 423/608, 609

[56] References Cited

U.S. PATENT DOCUMENTS 4,315,905  2/1982  Bens et al. ........................... 423/592

FOREIGN PATENT DOCUMENTS 1009170   5/1957  Fed. Rep. of Germany ...... 423/609
45-20967  7/1970  Japan .................................... 423/592
43505     1/1927  Norway ............................... 423/609

OTHER PUBLICATIONS

Galkin et al, "Chemical Absts.", vol. 58, 1963, #5225(d).
Yankelevich et al, "Chemical Absts.", vol. 86, 1977, #64691(j).

Primary Examiner—H. T. Carter
Attorney, Agent, or Firm—Oblon, Fisher, Spivak, McClelland & Maier

[57] ABSTRACT

This invention relates to a process for preparing a titanium oxide powder comprising heating titanium dioxide powder in an atmosphere of ammonia gas at a temperature of about 500° C. to about 950° C. The product powder is very fine, highly uniform in particle size and useful as an electrically conductive material. The powder is colored blue to black depending upon the process conditions and therefore is useful as a pigment, too.

4 Claims, No Drawings

PROCESS FOR PREPARING A TITANIUM OXIDE POWDER

This application is a continuation of application Ser. No. 445,266, filed Nov. 29, 1982, now abandoned.

TECHNICAL FIELD OF THE INVENTION

This invention relates to a process for preparing a titanium oxide powder.

BACKGROUND OF THE INVENTION

Electrically conductive powders are used as fillers to form electrically conductive layers for recording papers or to prepare electrically conductive plastics or antistatic plastics. Electrically conductive powders may be incorporated in magnetic tapes or recording sheets to reduce their electrostaticity.

As such electrically conductive powders, carbon black powders are now most generally used, since they are inexpensive and have electrical conductivity suitable for the abovementioned uses, that is, a specific resistance on the order of 1 to $10^{-2}$ Ωcm. However, it is not easy to disperse carbon black powders uniformly in some resins, because the surface thereof is hydrophobic. In addition, some carbon black powders may contain carcinogenic 3,4-benzpyrene, which is derived from the raw material from which the carbon black powders are prepared. Therefore, there is an increasing concern over the safety of the carbon black powder for users and workers who handle it.

Carbon black powders are also used as black pigments or colored fillers. But because of their possible toxicity, it is not proper to use them in the cosmetic or food industry. Therefore, there is a demand for non-toxic blue or black pigments in these industrial fields, although electrical conductivity is not necessarily required in the materials used in these fields. Needless to say, pigments used for human skin or colored fillers used for food container plastics must be harmless.

When carbon black powders are used as black pigments, they are usually mixed with other pigments such as titanium dioxide ($TiO_2$), and are dispersed in a fluid material. But it is sometimes difficult to maintain a stable uniform dispersion due to the fact that the specific surface area of the carbon black powder is much greater than that of the other pigments. Also the above-mentioned toxicity of carbon black poses serious problems against the usage in cosmetic industry.

Stannic oxide ($SnO_2$) powder, copper iodide (CuI) powder, etc. are also known as electrically conductive powders. However, it is difficult to steadily produce these powders with uniform quality. In addition, these materials are toxic, too.

Magnetite ($Fe_3O_4$) is also known as a black pigment, but its thermal instability and aggregativeness due to the magnetism possessed by the powder limit its usage.

On the other hand, the so-called "lower titanium oxide powder", a non-stoichiometric compound, the O/Ti gram-atom ratio of which is less than 2 can be easily dispersed in nearly all resins, because it has an affinity for resins stronger than the other electrically conductive powders such as carbon black powders. Another advantage of the lower titanium oxide is the fact that the specific resistance thereof can be varied over a wide range of $10^3$ to $10^{-2}$ Ωcm depending on the degree of reduction when it is made from $TiO_2$. Therefore, for a particular purpose a powder with a desired electrical conductivity can be selected. The O/Ti gram-atom ratio of stoichiometric titanium dioxide is 2, while the lower titanium oxide has an O/Ti gram-atom ratio less than 2 and the ratio varies with the degree of reduction. For example, $Ti_6O_{11}$, $Ti_7O_{13}$, $Ti_9O_{17}$ etc. are known. Generally, the specific resistance of the lower titanium oxide powder decreases as the O/Ti gram-atom ratio decreases.

The color of lower titanium oxides varies depending on the degree of reduction as well, and so it exhibit various tints such as greenish gray, bluish gray, bluish black, black, purplish black, bronze, etc. In addition, the lower titanium oxide is non-toxic so thaft the safety of users and workers is ensured. Therefore, this material has been expected to be used for many purposes such as afore-mentioned electrically conductive filler and gray or black pigment. However, it was difficult as described hereinafter to obtain a lower titanium oxide powder which is very fine and highly uniform in particle size, although such a powder is required as an electrically conductive material and as a pigment. Therefore the lower titanium oxide powder has not been practically used heretofore.

A process for preparing the lower titanium oxide was reported by P. Ehrlich (Z. Elektrochem., 45, 362 (1939)). The process comprises heating a mixture of titanium dioxide ($TiO_2$) powder and metallic titanium powder is vacuo. According to said process, oxidation-reduction proceeds between the solid phases of titanium dioxide and metallic titanium. Therefore a lower titanium oxide with a desired electrical conductivity or of a desired tint can be produced by changing the mixing ratio of the starting titanium dioxide and metallic titanium. However, since said solid phase reaction is usually carried out at a high temperatures of 1000° to 1600° C., the particles of the mixed powder are inevitably sintered, and therefore the particle size increases during the reaction and the particle size of the resulting lower titanium oxide is liable to be non-uniform. In addition, said process requires a relatively long time to complete the reaction. In order to obtain a lower titanium oxide powder having a desired particle size by said process, the particle size of the starting material must be considerably smaller than the particle size desired in the product powder, because particles sinter and grow larger during the reaction. It is desirable that the particle size of an electrically conductive material or a pigment be as small as possible, preferably not greater than 1.0 μm and that said particles be highly uniform in size. However, since the metallic titanium powder having a particle size of 1.0 μm or less is not readily available at present. Even if a metallic titanium powder having an average particle size of about 1 μm were used as the raw material, some amount of excessively large particles, which are not appropriate for practical use, would be inevitably formed. Further, the uniformity of the thus obtained powder would be low because of the irregular particle growth. As described above, said prior art process can not produce a lower titanium oxide powder having the desired properties.

Another process for preparing the lower titanium oxide was reported by P. Ehrlich (Z. Anorg. Allg. Chem., 247, 53 (1941)). The process comprises heating titanium dioxide powder in a hydrogen atmosphere to reduce the O/Ti gram-atom ratio of the powder. In this process, a temperature of 950° C. or higher must be employed. However, under such a high temperature, particles significantly sinter and grow larger so that excessively large particles are produced.

This invention is based on the discovery of the fact that when titanium dioxide powder is reduced in an atmosphere of ammonia gas instead of hydrogen gas, the reduction of $TiO_2$ can proceed at a low temperature even under 950° C. and can be completed within a short time. Accordingly the processing temperature for reduction of $TiO_2$ can be lowered to under 950° C., and therefore the particle size of the product powder remains as fine as that of the starting $TiO_2$ powder.

SUMMARY OF THE INVENTION

It is accordingly the object of this invention to provide a process for preparing a titanium oxide powder which is very fine and highly uniform in particle size, preferably not greater than 1.0 μm.

Briefly, the process of this invention comprises heating titanium dioxide powder in an atmosphere of ammonia gas at a temperature of about 500° C. to about 950° C.

DETAILED DESCRIPTION OF THE INVENTION

X-ray diffractometry showed that the titanium oxide powder prepared by the process of this invention is titanium monoxide (TiO) or a mixture of titanium dioxide ($TiO_2$) and titanium monoxide (TiO). Therefore, each particle of the powder is considered to be TiO particle or a microscopic composite of $TiO_2$ and TiO. However, the properties of the powder of this invention are equivalent to those of the afore-mentioned powder referred to as lower titanium oxide. That is, the electrical conductivity of the powder of this invention increases with the degree of reduction, and the tint of the powder of this invention also varies in the same manner as that of lower titanium oxide powder. Therefore, the powder of this invention is useful as an electrically conductive material as well as a pigment. Since the specific resistance of the powder of this invention can be varied over a range of $10^3$ to $10^{-3}$ Ωcm depending on the degree of reduction, the resulting powder can be made to have a desirable electrical conductivity by controlling to the degree of reduction. This powder has a wear-resistance enhancing effect, and when it is incorporated in magnetic tapes or recording sheets, the wear-resistance thereof can be improved too. Also, in the case where the powder is to be used as a pigment, a powder with a desired color can be obtained by controlling the degree of reduction. According to the process of the invention, the degree of reduction can be easily controlled by selecting an appropriate processing temperature and an appropriate processing time. The process can be completed within a short processing time of about 1 to 6 hours.

The employment of ammonia gas instead of hydrogen gas as a reducing agent enables a remarkable lowering of processing temperature. However, the reduction does not proceed satisfactorily at a temperature lower than 500° C. At such a low temperature, even if the reduction proceeds, it takes an undesirably long time. The reduction of titanium dioxide powder in this process proceeds effectively at a temperature of 500° to 950° C., and at said temperature there is almost no growth of particles of the powder by sintering. As a result, the form and the particle size of the particles of the product powder remains as nearly the same as that of the initially used titanium dioxide. Therefore, a titanium oxide powder of uniform particles of a desired size can easily be prepared by properly selecting the size and size distribution of the starting titanium dioxide. Sintering and growth of particles significantly occur at temperatures higher than 950° C. As mentioned above, both processing temperature and processing time are important factors which affect the degree of reduction of the product titanium oxide powder. Therefore the processing time must be determined so that the desired degree of reduction can be achieved. Considering the length of processing time required and prevention of sintering of particles, a temperature of 650° C. to 900° C. is preferred in general.

Besides temperature and processing time, the type of the titanium dioxide powder which is used as the raw material, the amount thereof charged into a reactor, the flow rate of ammonia gas, etc. affect the reaction and also affect the electrical conductivity and the other properties of the product powder.

Titanium dioxide of any crystalline form, that is, anatase, rutile and brookite can be used as raw materials in the process of this inventin. Either titanium dioxide powder prepared by the sulfate process or that prepared by the chloride process can be used. Also, there can be used a titanium dioxide powder whose particles are coated with $Al_2O_3$, $SiO_2$, etc. so as to modify the surface properties of the particles. Thus the titanium dioxide powder as the raw material can be selected from a wide range of materials, and therefore the particle size of the starting powder can be selected from a wide range, too. The fact that the raw material can be selected from various kinds of $TiO_2$ powders means that inexpensive titanium dioxide powders can be used and therefore the production cost can be reduced. When a finer titanium dioxide is used, reduction proceeds at relatively lower temperatures, and therefore the product powder retains the original particle size. the rutile-type titanium dioxide is reduced more easily than the anatase-type, since the former is more active than the latter. And the non-coated titanium dioxide powder is reduced somewhat more easily than the powders modified by coating with $Al_2O_3$, $SiO_2$, etc. When $TiO_2$ powder is reduced in a stationary furnace, the thickness of the powder-layer charged into the furnace is important. Since if the layer thickness exceeds about 10 mm, ammonia gas cannot penetrate well into the interior of the layer and reduction of the powder does not proceed completely. Accordingly, it is preferred to use a rotary-type furnace or a fluidized-bed type furnace for instance, rather than a stationary furnace such as a tubular furnace, because the former allows more intimate contact of the powder with ammonia gas, although any types of furnace or kiln can be used in the process of this invention. With respect to the flow rate of ammonia gas in the reactor, greater linear velocity is preferred insofar as no carry-over loss of the powder is caused, since the greater the linear velocity of the gas-stream is, the more uniform the resulting powder is. The linear velocity of the gas-stream is preferably at least 0.5 cm/sec, because non-uniformly reduced powder may be produced at a linear velocity of less than 0.5 cm/sec.

As seen from the bove description, in accordance with the invention it is easy to prepare a titanium oxide powder having any desired particle size and electrical conductivity as well as high uniformity in properties. The electrical conductivity and color of the product powder can be easily controlled.

The following experiment and examples illustrate the preparation of titanium oxide powders of this invention, but are not intended to delimit the scope of this inventin.

EXPERIMENTS

An experiment was conducted to show that the progress of reduction of titanium dioxide powder depends on processing temperature and processing time.

Various titanium dioxide powders having different particle sizes of 0.02 to 0.5 μm were charged into a reactor. A tubular furnace was used as the reactor. Ammonia gas was passed at a linear velocity of 1 cm/sec. in the reactor and then the temperature in the reactor was raised at a slow rate of 0.5° C./min. When the temperature in the reactor reached predetermined temperatures, the powder was withdrawn from the reactor in order to examine its color and the specific resistance. The following changes were observed as the temperature was raised.

Titanium dioxide gradually began to be reduced at about 500° C., when the powder turned grayish white and it had a specific resistance of $10^3$ to $10^5$ Ωcm. As the temperature was raised to 600° C. and then to 700° C., the color of the powder changed from grayish white to grayish green and the specific resistance became $10^2$ to $10^4$ Ωcm. Further, when the temperature was raised to 800° C., the color became bluish gray or bluish black and the specific resistance decreased to about 10° Ωcm. When the temperature was raised to 850° C. to 900° C., the powder was further reduced, and it became purplish black and the specific resistance thereof decreased to $10^{-2}$ Ωcm. At the temperature of 950° C. or higher, significant sintering and growth of particles occurred, adversely affecting the properties of the powder as an electrically conductive material or a pigment.

Another experiment showed that a processing time of 1 to 6 hours is required to obtain a titanium oxide powder having uniform properties, although the time depends on processing temperature, etc.

In a still another experiment, from a 0.02μ fine $TiO_2$ powder, a black powder with a specific resistance of $10^{-2}$ Ωcm was obtained even at a lower temperature of 800°–850° C. when the gas flow rate was 5 cm/sec.

EXAMPLE 1

Fifty (50) grams of an anatase-type titanium dioxide powder ("P-25", a product of DEGUSSA) having a particle size of 0.03 μm (specific surface area: 54 m²/g) was put in a boat, and was then reduced in a tubular furnace in an ammonia gas stream at a linear velocity of 2 cm/sec. at 800° C. for 5 hours. After the powder was cooled to room temperature in the atmosphere of ammonia gas, the ammonia gas was replaced with nitrogen gas and then the powder was recovered. The powder thus obtained was bluish black and had a specific resistance of 0.9 Ωcm. And it was a very fine powder having a specific surface area of 31 m²/g and an average particle diameter of 0.05 μm. In X-ray diffractometry, the diffraction strength ratio of $TiO_2$ to TiO proved to be 6/4. Only diffraction by the rutile-type structure was observed with respect to $TiO_2$.

EXAMPLE 2

One hundred (100, grams of an anatase-type titanium dioxide powder ("TCA 123", a product of Tohoku Kagaku K.K.) having a particle size of 0.17 μm (specific surface area: 9 m²/g) was charged into a rotary furnace and was then reduced in an ammonia gas stream at a linear velocity of 3 cm/sec. at 850° C. for 3 hours. Thereafter, the powder was cooled to room temperature. The resultant product was a purplish black powder having a specific surface area of 8.5 m²/g (average particle diameter: 0.18 μm) and a specific resistande of 0.04 Ωcm. In X-ray diffractometry, the diffraction strength ratio of $TiO_2$ to TiO proved to be 6/4. Diffraction by the rutile-type structure in addition to that by the anatase type structure was observed with respect to $TiO_2$.

EXAMPLE 3

The same procedure as in Example 2 was followed except that the reduction was carried out at 700° C. for 4 hours. The product powder was white tinged with grayish green, and had a specific surface area of 9.4 m²/g (average particle diameter: 0.16 μm) and a specific resistance of 2 kΩcm. In X-ray diffractometry, the diffraction strength ratio of $TiO_2$ to TiO proved to be 20/1, and the $TiO_2$ consisted largely of anatase-type titanium dioxide and contained rutile-type only slightly.

EXAMPLE 4

Fifty (50) grams of a rutile-type titanium dioxide powder (specific surface area: 7 m²/g, "Bayer T", a product of Bayer A.G.) was put in a boat, and was then reduced in an ammonia gas stream at a linear velocity of 2 cm/sec. at 900° C. for 6 hours in a tubular furnace. The powder was recovered after having been cooled to room temperature. The thus obtained powder was purplish black, and had a specific surface area of 6.3 m²/g (average particle diameter: 0.23 μm) and a specific resistance of 0.008 Ωcm. In X-ray diffractometry, the diffraction strength ratio of $TiO_2$ to TiO was 5/5.

EXAMPLE 5

The same procedure as in Example 1 was followed except that the reduction was carried out at 550° C. for 6 hours. The titanium oxide powder thus obtained was grayish white and had a specific surface area of 50 m²/g (average particle diameter: 0.03 μm) and a specific resistance of 9 kΩcm. In X-ray diffractometry the diffraction strength ratio of $TiO_2$ to TiO was 15/1. The $TiO_2$ consisted of anatwse structure and rutile structure.

EXAMPLE 6

The same procedure as in Example 1 was followed except that the reduction was carried out at 950° C. for 5 hours. The product powder showed bronze color, and had a specific surface area of 10 m²/g (average particle diameter: 0.15 μm) and a specific resistance of 0.007 Ωcm. According to X-ray diffractometry, the powder consisted of only TiO.

EXAMPLE 7

Fifty (50) grams of an anatase-type titanium dioxide powder ("P-25", a product of DEGUSSA) having the particle size of 0.03 μm (specific surface area: 54 m²/g) was put in a fluidized-bed furnace, and was then reduced in an ammonia gas stream at a linear velocity of 4 cm/sec. at 800° C. for 3 hours. After the powder was cooled to room temperature in the atmosphere of ammonia gas, the ammonia gas was replaced with nitrogen gas and then the powder was recovered. The powder thus obtained was black and had a specific resistance of 0.04 Ωcm. And it was a very fine powder having a specific surface area of 40 m²/g and an average particle diameter of 0.04 μm. By X-ray diffractometry it was confirmed that the powder consisted mainly of TiO with a trace of $TiO_2$.

COMPARATIVE EXAMPLE 1

The titanium dioxide powder used in Example 1 was reduced in a hydrogen gas stream at a linear velocity of 4 cm/sec. at 900° C. for 6 hours in the same tubular furnace as that used in Example 1. The thus obtained powder was blue, and had a specific resistance of 70 Ωcm. Particles of the powder were significantly sintered and grew larger, resulting in a specific surface area of 1.8 m²/g (average particle diameter: 0.8 μm).

COMPARATIVE EXAMPLE 2

One hundred (100) grams of the titanium dioxide powder used in Example 3 was reduced in a hydrogen gas stream at a linear velocity of 3 cm/sec. at 850° C. for 6 hours, using the rotary furnace used in Example 2. The product powder was light blue, and had a specific surface area of 4 m²/g (average particle diameter: 0.38 μm) and a specific resistance of 50 kΩcm.

COMPARATIVE EXAMPLE 3

Fifty (50) grams of the titanium dioxide powder used in Example 2 was put in a boat, and was reduced in the same furnace as that used in Example 2 in a hydrogen gas stream at a linear velocity of 6 cm/sec. at 950° C. for 5 hours. The resulting powder was dark blue, and had a specific surface area of 0.7 m²/g (average particle diameter: 2 μm) and a specific resistance of 4 Ωcm.

We claim:

1. In a process for preparing a composite titanium oxide powder by reduction of titanium dioxide powder, the improvement comprising conducting said reduction in an atmosphere of ammonia gas at a temperature between about 500° C. and 950° C., whereby the particle size of the composite titanium oxide powder product is uniformed and not significantly greater than that of the initial titanium dioxide powder.

2. The process as described in claim 1, wherein said titanium dioxide powder is heated in a stream of ammonia gas at a linear velocity of 0.5 cm/sec. or higher.

3. The process as described in claim 1, wherein said titanium dioxide powder is heated at 650° C. to 900° C.

4. The process as described in claim 1, wherein said titanium dioxide is of anatase-type, rutile-type or brookite-type structure.

* * * * *